United States Patent
Hancock et al.

(10) Patent No.: US 6,307,559 B1
(45) Date of Patent: *Oct. 23, 2001

(54) METHOD AND APPARATUS FOR COLOR SPACE CONVERSION, CLIPPING, AND SCALING OF AN IMAGE DURING BLITTING

(75) Inventors: Steven Marshall Hancock; Mark A. Pietras, both of Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 687 days.

(21) Appl. No.: 08/502,037

(22) Filed: Jul. 13, 1995

(51) Int. Cl.$^7$ .................................................. G06F 3/00
(52) U.S. Cl. ................................................................ 345/433
(58) Field of Search .................................... 395/130–139; 345/430–439

(56) References Cited

U.S. PATENT DOCUMENTS

| | | | |
|---|---|---|---|
| 4,821,209 | 4/1989 | Hempel et al. | 395/134 |
| 4,823,286 * | 4/1989 | Lumelsky et al. | 395/132 |
| 4,831,580 * | 5/1989 | Yamada | 395/133 |
| 4,870,397 * | 9/1989 | Soto et al. | 395/133 |
| 4,994,917 | 2/1991 | Takayama | 248/250 |
| 5,020,115 | 5/1991 | Black | 382/298 |
| 5,146,548 | 9/1992 | Bijnagte | 395/117 |
| 5,208,871 | 5/1993 | Eschbach | 332/252 |
| 5,224,062 | 6/1993 | McMillan, Jr. et al. | 364/725 |
| 5,276,798 * | 1/1994 | Peaslee et al. | 395/130 X |
| 5,291,275 | 3/1994 | Lumelsky | 348/441 |
| 5,303,334 * | 4/1994 | Snyder et al. | 395/130 X |
| 5,337,160 | 8/1994 | Jones | 358/447 |
| 5,394,523 * | 2/1995 | Harris | 395/131 X |
| 5,522,021 * | 5/1996 | Huang et al. | 395/138 |
| 5,552,803 * | 9/1996 | Rhodes et al. | 395/131 X |
| 5,604,850 * | 2/1997 | Whitmer | 395/135 |
| 5,668,941 * | 9/1997 | Noorbakhsh | 345/434 |
| 5,699,498 * | 12/1997 | Noorbakhsh | 345/431 |
| 5,706,034 * | 1/1998 | Katsura et al. | 345/508 |
| 5,745,762 * | 4/1998 | Celi, Jr. et al. | 395/681 |

* cited by examiner

*Primary Examiner*—John Breene
(74) *Attorney, Agent, or Firm*—Leslie A. Van Leeuwen; Bracewell & Patterson, L.L.P.

(57) ABSTRACT

A method of and apparatus for performing blitter operations is performed in two parts. First, a description of the to-be-performed data transfer is analyzed and a computer instruction sequence is generated therefrom. The instruction sequence may include the appropriate instructions to implement scaling, clipping, and color conversion of a source image, as implicated by the blitter description. Second, the computer instruction sequence is executed an appropriate number of times, again depending upon the blitter description. One of the described embodiments transforms a blitter description that describes a target image in terms of visible rectangles into a description that describes the target image as having at least one line-type, in which the line-type comprises at least one pixel run, characterized by visible and non-visible states. The line-type description is then utilized by a code-generating logic to generate the appropriate instructions. The apparatus for performing the blitter operations may be implemented as an interface library, thus allowing client programs, including interactive games, to use the advantages of the invention to perform rapid screen updates.

12 Claims, 15 Drawing Sheets

```
LOAD SOURCE PIXEL
CONVERT PIXEL TO DESTINATION FORMAT
STORE DESTINATION PIXEL
LOAD SOURCE PIXEL
CONVERT PIXEL TO DESTINATION FORMAT
STORE DESTINATION PIXEL
STORE DESTINATION PIXEL

<SEQUENCE REPEATS FOR VISIBLE PIXELS IN RUN>

ADVANCE DESTINATION POINTER OVER INVISIBLE
PIXEL RUN

LOAD SOURCE PIXEL
CONVERT PIXEL TO DESTINATION FORMAT
STORE DESTINATION PIXEL
LOAD SOURCE PIXEL
CONVERT PIXEL TO DESTINATION FORMAT
STORE DESTINATION PIXEL
STORE DESTINATION PIXEL

<SEQUENCE REPEATS FOR REMAINING VISIBLE
PIXELS IN RUN>
```

*FIG. 10*

METHOD AND APPARATUS FOR COLOR SPACE CONVERSION, CLIPPING, AND SCALING OF AN IMAGE DURING BLITTING

FIELD OF THE INVENTION

This invention relates to a method and apparatus for performing color conversion, clipping, and scaling of an image in a data processing system.

BACKGROUND OF THE INVENTION

FIG. 1 illustrates the system architecture for a conventional computer system, such as an IBM PS/2® computer. The exemplary computer system of FIG. 1 is for descriptive purposes only. Though the description below may refer to terms commonly used in describing particular computer systems, such as an IBM PS/2 computer, the description and concepts equally apply to other systems, including systems having architectures dissimilar to FIG. 1.

The exemplary computer 100 includes a central processing unit (CPU) 105, which may include a conventional microprocessor; a system random access memory (RAM) 110 for temporary storage of information and a read only memory (ROM) 115 for permanent storage of information. A memory controller 120 is provided for controlling system RAM 110. A bus controller 125 is provided for controlling bus 130. An interrupt controller 135 is used for receiving and processing various interrupt signals.

Mass storage may be provided by a diskette 142, a CD-ROM disk 147 or a hard disk 152. The diskette 142 can be inserted into a diskette drive 141, which is, in turn, connected to bus 130 by a controller 140. Similarly, the CD-ROM disk 147 can be inserted into a CD-ROM drive 146, which is also connected by a controller 145 to bus 130. Finally, hard disks 152 are part of a fixed disk drive 151, which is connected to bus 130 by controller 150.

Data input and output to computer system 100 is provided by a number of devices. For example, a keyboard and mouse controller 155 connects to bus 130 for controlling a keyboard input device 156 and a mouse input device 157. A DMA controller 160 is provided for performing direct memory access to system RAM 110. A visual display is generated by a video controller 165, which controls a video output display 170. As will be further described below, video controller 165 may include a graphics engine 175, a frame buffer 180, and off-screen VRAM 185. Under the control of the computer system 100, display 170 presents a two dimensional array of picture elements (pixels), which may be independently controlled to form an image. Other input and output devices, such as an audio subsystem 191, may be connected to the system through expansion slot 190.

The computer 100 is generally controlled and coordinated by operating system software, such as the OS/2® operating system, available from the International Business Machines Corporation (IBM), Boca Raton, Fla. Conventional operating systems typically control and schedule computer processes for execution, perform memory management, provide a file system, networking capabilities, and I/O services, and provide a user interface, such as a graphical user interface (GUI), among other things. User applications, such as editors and spread sheets, directly or indirectly, rely on these and other capabilities of the operating system.

Computer systems are increasingly using sophisticated techniques to present information to a user. Modern computers use graphics capabilities to produce various graphical items, such as lines, boxes, and circles, on a display 170, typically in color. These graphics capabilities are used, for example, by GUIs and other computer applications.

In addition to graphics, modern computers are increasingly using multimedia techniques, which store, organize, and present various forms of data, including textual data, digital audio data, digital video data, and digital music data (e.g., MIDI). For example, a computer using multimedia techniques may play back video data and audio data to produce a movie clip video sequence on display 170 with synchronized audio output from audio subsystem 191.

Graphical and video images are conventionally produced by storing data for each pixel in a corresponding location of a frame buffer 180. These data are placed in the frame buffer 180 by graphics engines 175 or, as is further discussed below, by software. A frame buffer 180 is typically, although not necessarily, constructed from special memory chips called VRAMs, which allow conventional read and write operations to be performed to memory cells of the VRAM on one port, while allowing data to be scanned out from the cells via a second, scan port. The video controller 165 typically scans the data out and uses the data to cause corresponding pixels of the display 170 to be energized in accordance with the data. The size of a frame buffer 180 depends upon the number of pixels of the display 170 and the amount of data required for each pixel.

The display data may indicate whether or not a pixel should be illuminated, or if color images are involved, may indicate the desired luminance and chrominance for a pixel. Moreover, color data may be implemented according to a variety of formats, such as YUV, RGB, RBG, etc., which require many bits of data per pixel. Modern color formats, for example, may require up to three bytes, or twenty four bits, of information per pixel.

Producing graphical and video images requires a substantial amount of system resources. Even seemingly simple graphical items, such as lines and circles, may require considerable computation to determine which pixels should be illuminated to yield a high quality graphical item. Animated video usually requires a substantial amount of storage resources and bandwidth from system bus 130. A typical image may involve tens of thousands of pixels, and each pixel may involve several bytes of data. Moreover, video typically involves displaying a sequence of images at a playback rate approximately 15 to 45 images per second.

To help alleviate the computational burdens, various graphics engines have been developed to off-load the computational burden from the CPU 105 of producing graphical items. Graphic engines are known in the art and will not be further discussed.

To help alleviate the storage and bandwidth burdens, compression and decompression techniques are often utilized. With such systems, compressed video data are retrieved from system RAM 110. There, the compressed data may be decompressed by a software decompression routine. Afterwards, the decompressed data may be placed in frame buffer 180, or the decompressed data may be further operated upon by software, as described below.

Often, the image data, i.e., either the graphical or the decompressed video image data, need to be operated upon to provide a desired image. In some cases, the source image data may need to be stretched or scaled by a predefined amount. For example, an image may need to be scaled because a user has resized the image on the display 170 using the mouse 157. Scaling is conventionally performed by a software scaling routine. Referring to FIG. 2, for example, a source image 205 may be stored as a 160×120 pixel image, and the to-be-displayed, or target, image 210 may be 200×150 pixels. In this example, both the horizontal and the vertical dimensions of the source image 205 are scaled at a 5:4 ratio. That is, every 4 pixels of source image 205 in the horizontal dimension must yield 5 pixels of target image 210 in that direction, and every 4 rows of the source image 205 must yield 5 rows of target image 210. Often, this is achieved by copying certain bits and replicating other bits according to known scaling techniques. In the example of FIG. 2, a conventional technique would copy the first three pixels of the source image 205 and replicate a fourth pixel. In cases where an image must be scaled down, certain bits or rows would be excluded from the copying.

In other cases, the source image 205 may need to be color converted. For example, color conversion may be necessary, because the color format of the source image 205 may be unsupported by the display 170 (FIG. 1). For instance, the source image 205 may be stored in a RGB 5-5-5 format, and the target image 210 may need to be in RGB 24 (R-G-B) format. Color conversion is typically performed by a color conversion routine.

In still other cases, the source image 205 may need to be clipped. For example, referring to FIG. 2, target image 210 is partially obscured or overlaid by image 215. The shaded region 220 is clipped from target image 210. Thus, when the source image 205 is transferred to the frame buffer 180, the image must be clipped so that source data are not written into the frame buffer locations corresponding to the shaded region 220.

In each case, conventional techniques typically invoke a routine to perform a corresponding color conversion, scaling, or clipping operation on the source image 205, or possibly on an intermediate image, as described below. As is known in the art, these conventional routines are often implemented with computer instructions that cause the CPU 105 (FIG. 1) to loop through the source or intermediate data and perform a corresponding operation on that data. For example, a conventional color conversion routine would use nested looping instructions to loop through the rows and columns of a two dimensional array of source image data for source image 205. For each pixel's data, the routine may index a color conversion look-up table with the pixel's data, and the table provides the color converted data for that pixel.

If multiple operations need to be performed on a source image 205, conventional techniques invoke a corresponding routine for each operation in a sequence. For example, if a source image 205 needs to be color converted, scaled, and clipped, conventional techniques would likely invoke a color conversion routine to color convert the source image 205. The color converted image would then be placed in an intermediate data buffer of RAM 110. Then, a scaling routine may be invoked to scale the intermediate, color converted image data, and the scaled and color converted data would be placed in another intermediate data buffer of RAM 110. Lastly, a clipping routine would likely be invoked to clip the scaled and color converted data from the intermediate buffer of RAM 110 to the frame buffer 180, typically according to a mask that would indicate which pixels of color converted and scaled data should be transferred.

After the data was thus operated upon, the data would be .BLTed. to a frame buffer or the like. The terms .blitter. and .BLT. are generally known in the art to refer to block transfer operations of image data, usually, to a frame buffer memory, but also to other target locations, such as a buffer of off-screen VRAM.

As is readily seen, each individual color conversion, scaling, or clipping operation involves moving a substantial amount of data to and from RAM 110, as each routine reads and writes large intermediate data buffers. Consequently, system performance is hindered by the substantial amount of intermediate data movement between the CPU 105 and RAM 110.

Moreover, the instruction looping performed by the conventional routines degrades the performance of modern CPUs 105. This performance degradation is usually attributed to, among other things, instruction looping's detrimental impact on register usage in modern complex instruction set CPUs.

In addition, the prior art conventionally implemented the above-described color conversion, scaling, and clipping functionality as part of the software modules that performed rapid screen updates, for example, as part of video decompressor modules. This approach, however, has certain drawbacks. For instance, the software that performed the color conversion, scaling, and clipping had to be replicated in each of the various modules that performed rapid screen updates, increasing development and maintenance costs. Moreover, the color space conversion routines in each module supported only a limited number of target space conversions. The addition of new color space formats entailed updating numerous modules, some of which may have been developed by other software developers. In addition, the image scaling capabilities for each video compression format were limited to whatever was implemented by the corresponding video decompressor module. Furthermore, the prior art provided no convenient interface to enable applications, such as interactive games, to perform rapid screen updates directly. That is, such applications would need to include all the complexity of scaling, color conversion, and clipping, if the applications desired to directly perform rapid screen updates.

Given that modern applications may require images to be presented at a rate on the order of forty-five images per second or more, those skilled in the art will readily appreciate the advantage of performing the above-described operations rapidly.

Moreover, given the further drawbacks described above, which arise from incorporating the above-described functionality into the various modules that perform rapid screen updates, those skilled in the art will readily appreciate the advantage of having the various features integrated into an interface library so that software, such as interactive games and the like, may invoke the functionality at a single source, thus allowing easier upgrades to color conversion, scaling, and clipping functionality, thereby reducing development and maintenance costs.

Accordingly, there is a need in the art for a method and apparatus that improves the performance of imaging operations.

Likewise, there is a need in the art to provide an improved method and apparatus to allow easier upgrades to imaging functionality and to reduce development and maintenance costs of the software.

An advantage of the present invention is that it provides a method and apparatus that efficiently performs image operations.

SUMMARY OF THE INVENTION

The instant invention relates to a method of and apparatus for quickly performing color conversion, scaling, and/or clipping operations on a source image to yield a color converted, scaled, and/or clipped target image, by performing a compound operation that does not involve multiple transfers of data. More particularly, the present invention includes novel techniques for performing blitter operations,. or .BLTs.

An illustrative embodiment of the invention includes a method of, and an apparatus for, performing blitter operations, which transfer source image data to a target image buffer, in accordance with a blitter description. The blitter description includes information describing the sizes and color formats of the source and target images. In addition, the blitter description may describe the target image in terms of visible rectangles.

The invention utilizes the blitter description to generate computer instructions in accordance with the description. If the description describes that a portion of the target image is clipped, the generated computer instructions will not include instructions to transfer source image data corresponding to the clipped portion. In addition, if the blitter description indicates that color conversion of the source image data is desired, instructions to implement the color conversion are included. Likewise, instructions may be included for scaling the source image. In all, the invention can generate the instructions to carry out the operations, i.e., scaling, clipping, and color converting, implicated by the blitter description.

The invention also contemplates execution of the generated instructions in accordance with the blitter description as well as execution of the computer instructions during the run time of a client program that is utilizing the invention.

In another embodiment, the invention contemplates incorporation of the various functionality into an interface library to provide an interface for client programs, including interactive games, to perform rapid screen updates by utilizing the invention.

BRIEF DESCRIPTION OF THE DRAWING(S)

The above and further advantages of the invention may be better understood by referring to the following description in conjunction with the accompanying drawings in which.

Figure 7A:
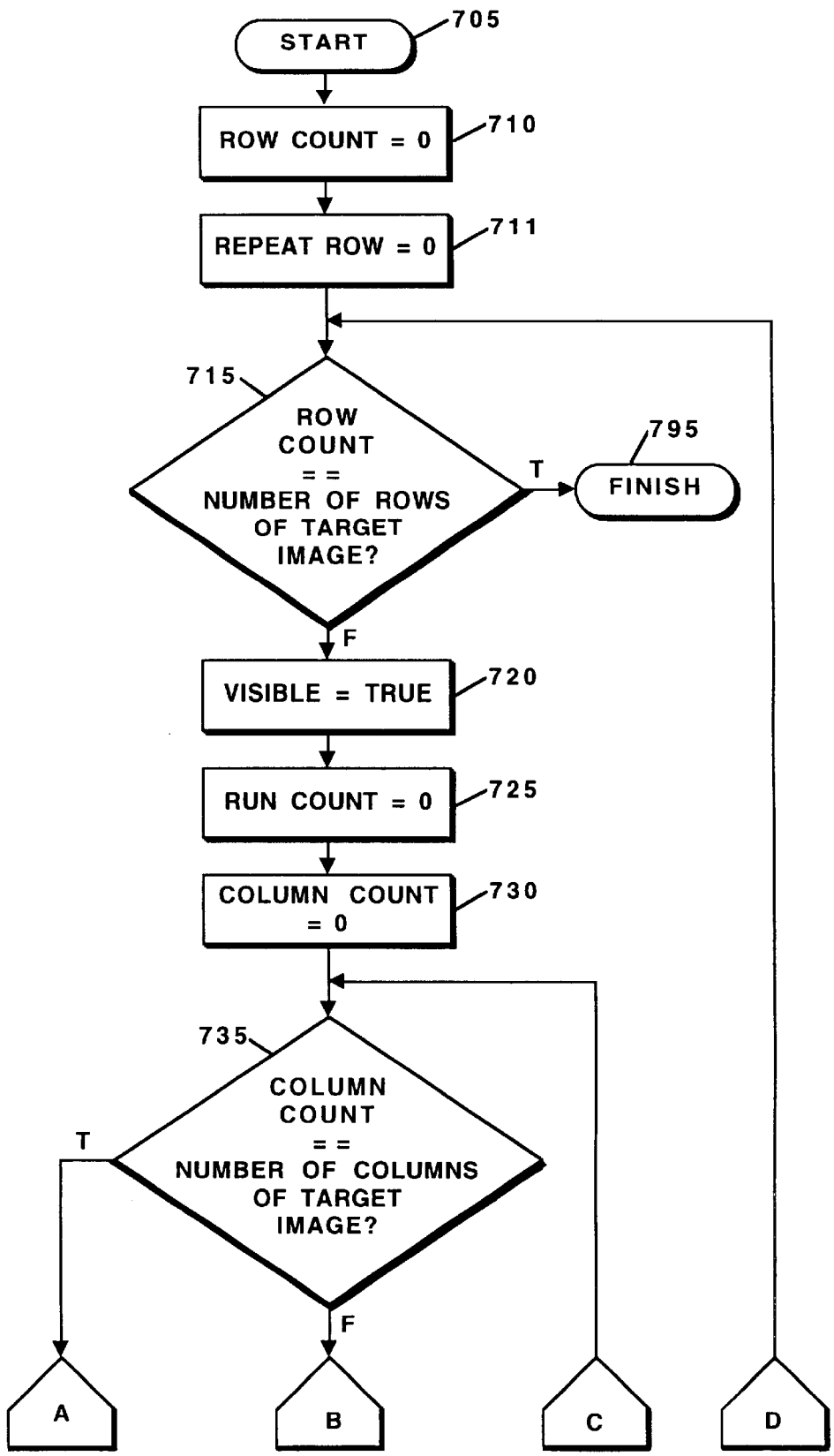
Figure 7B:
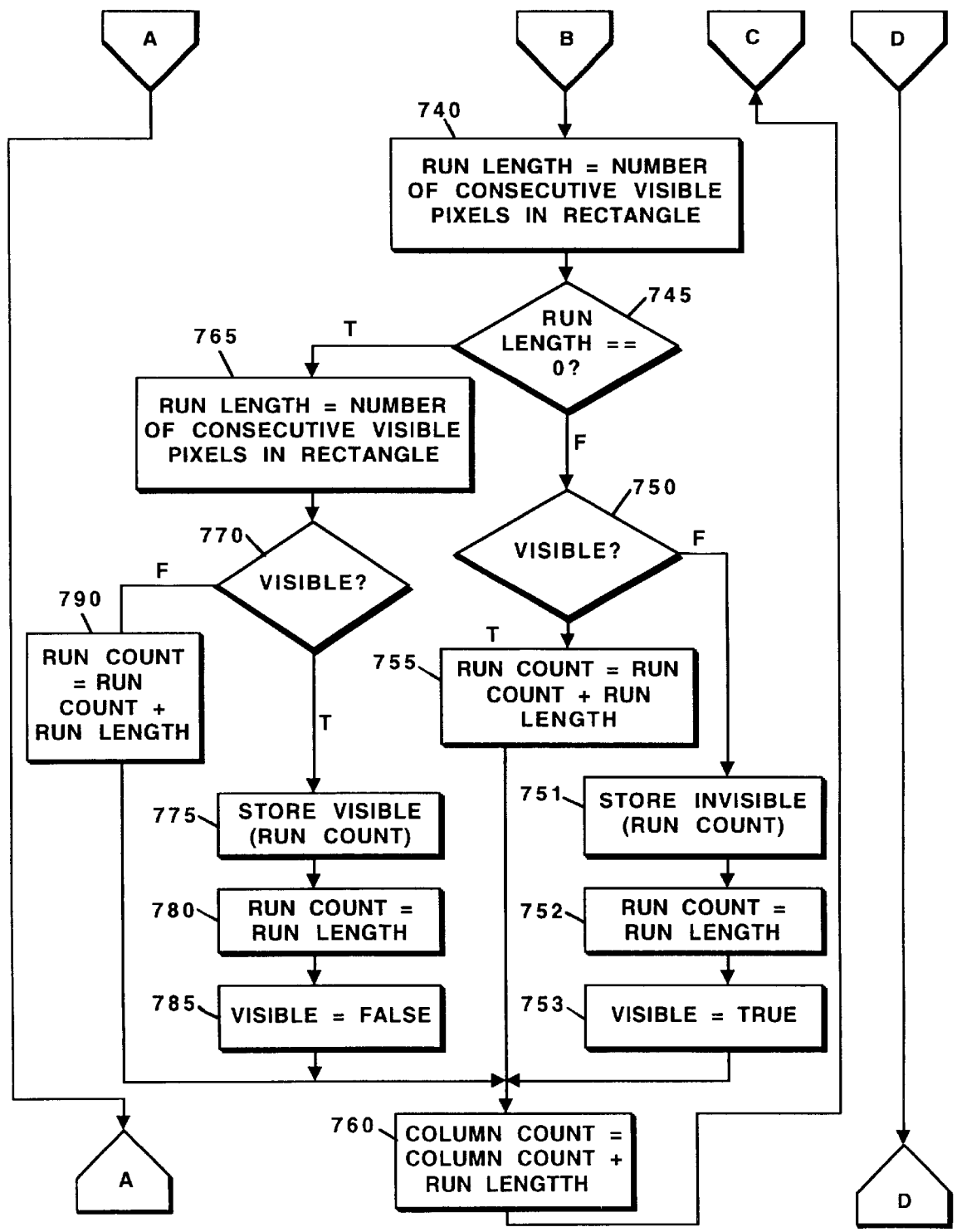
Figure 7C:
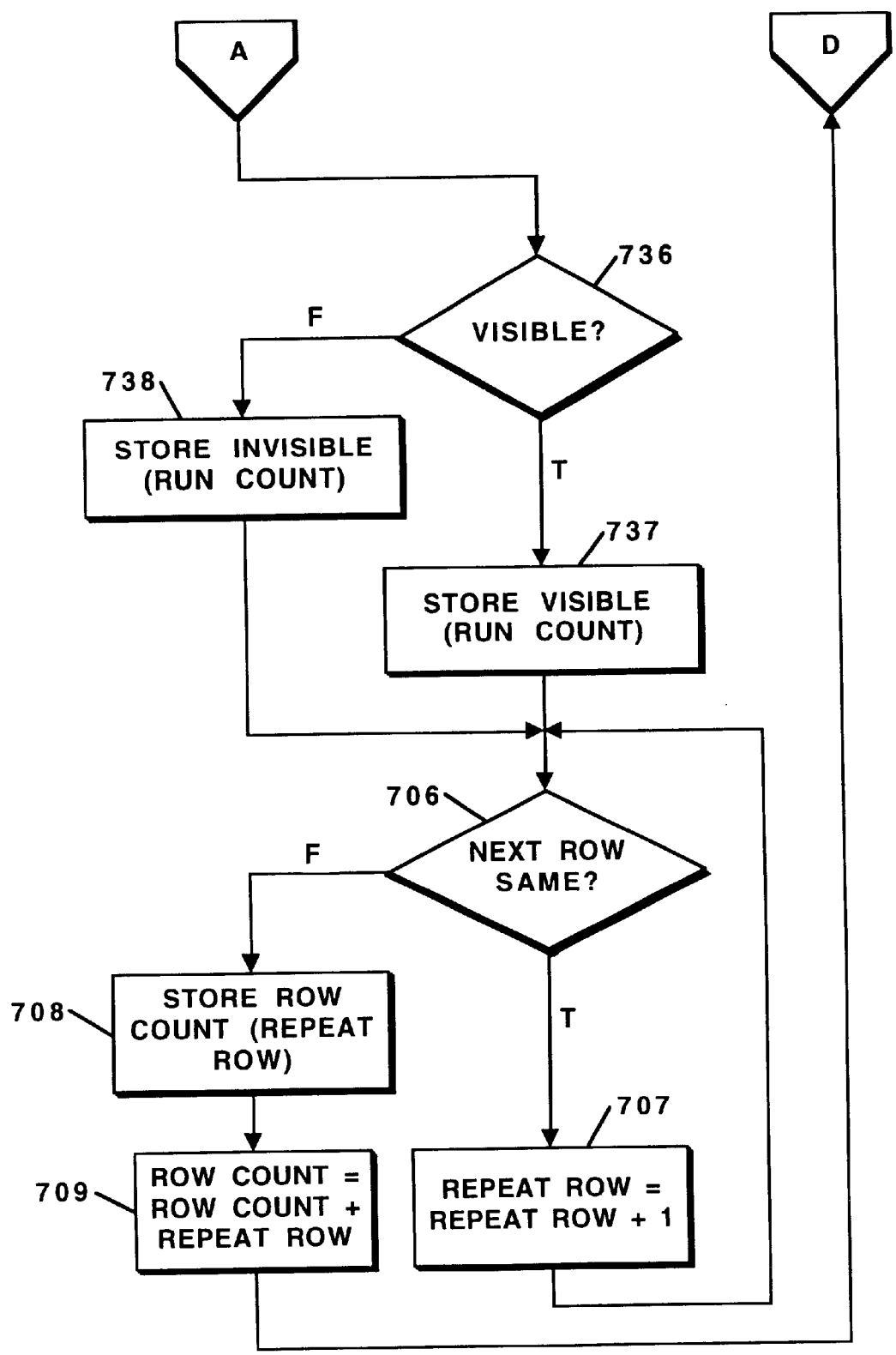
Figure 8:
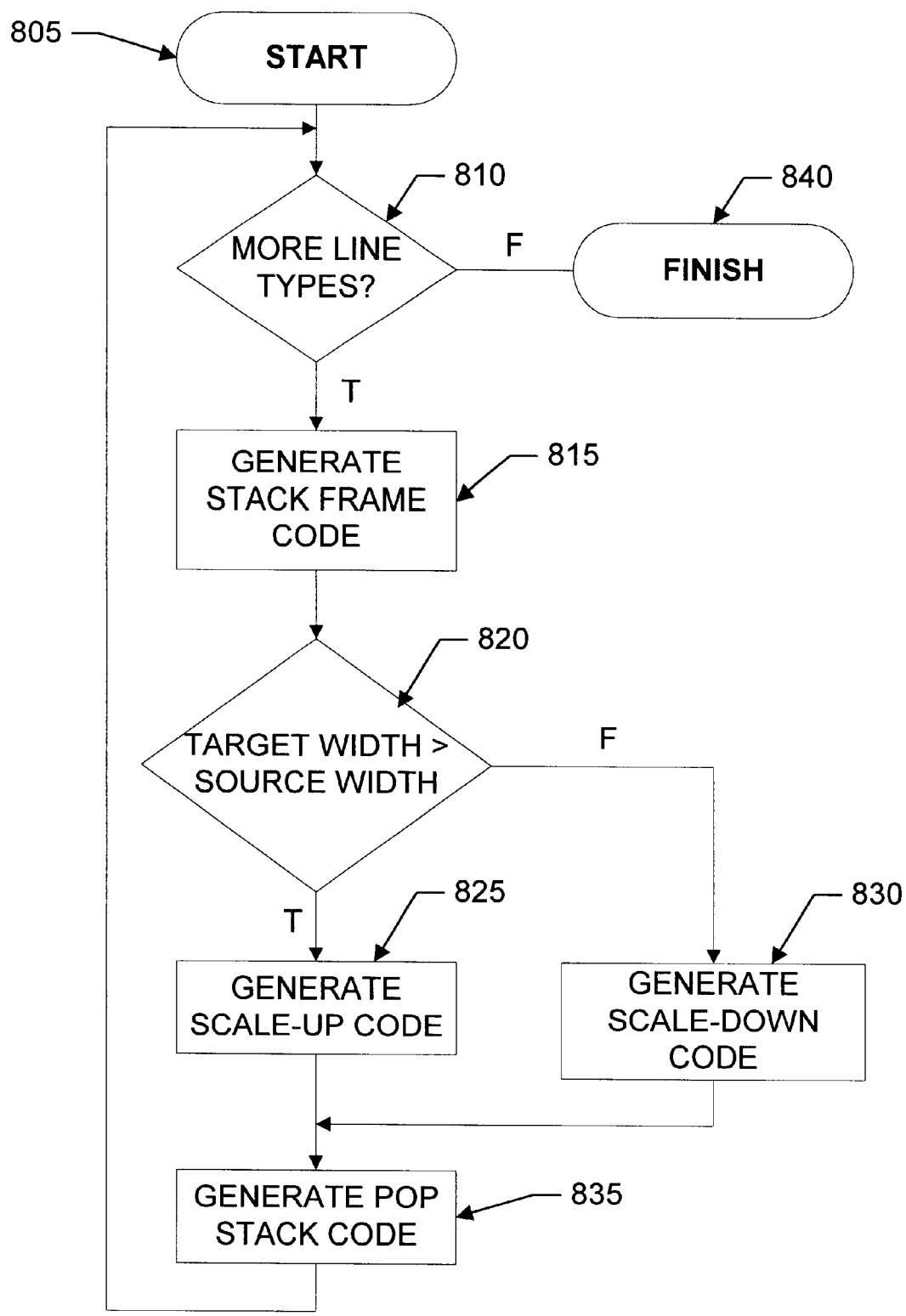
Figure 9A:
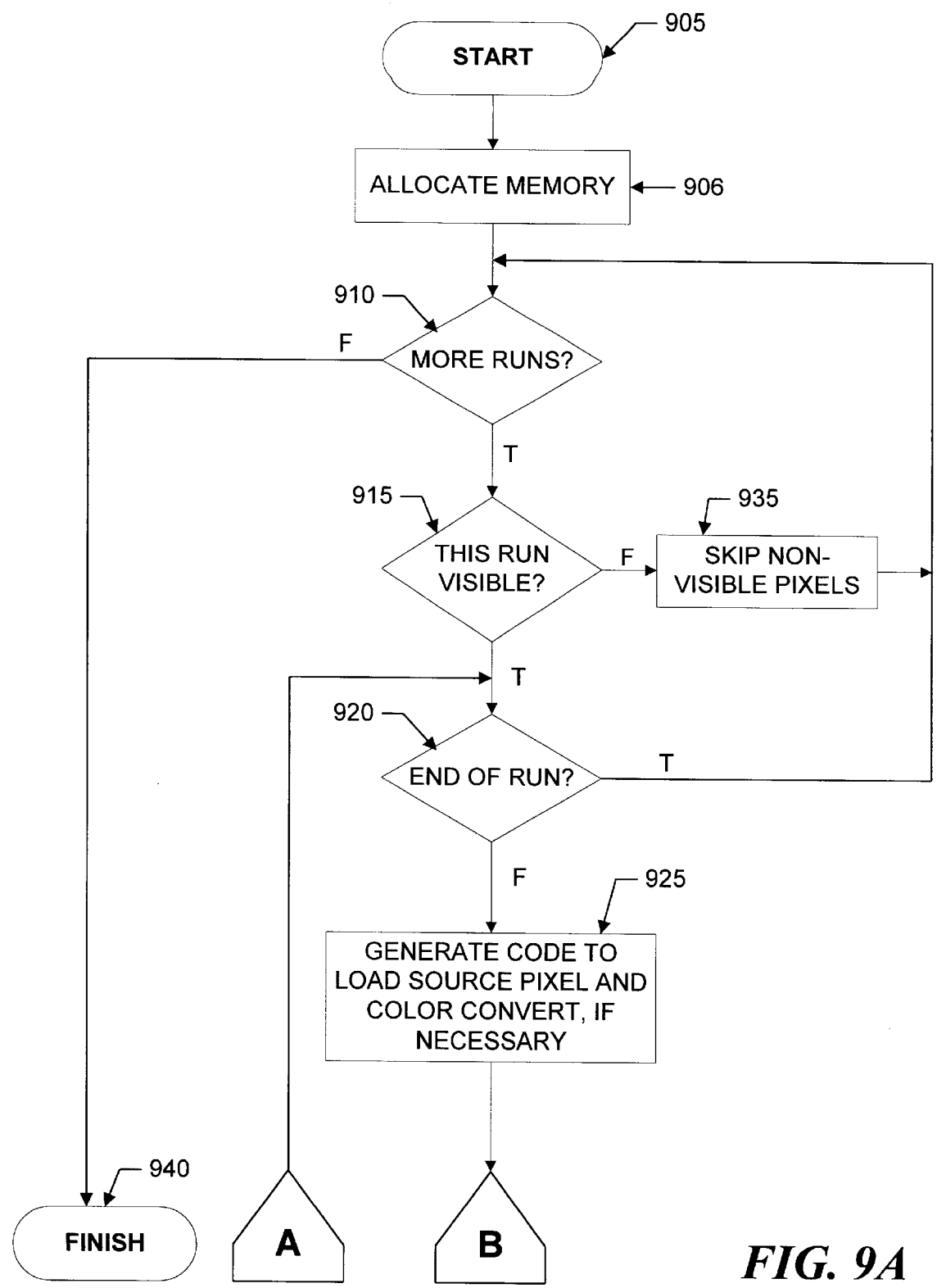
Figure 9B:
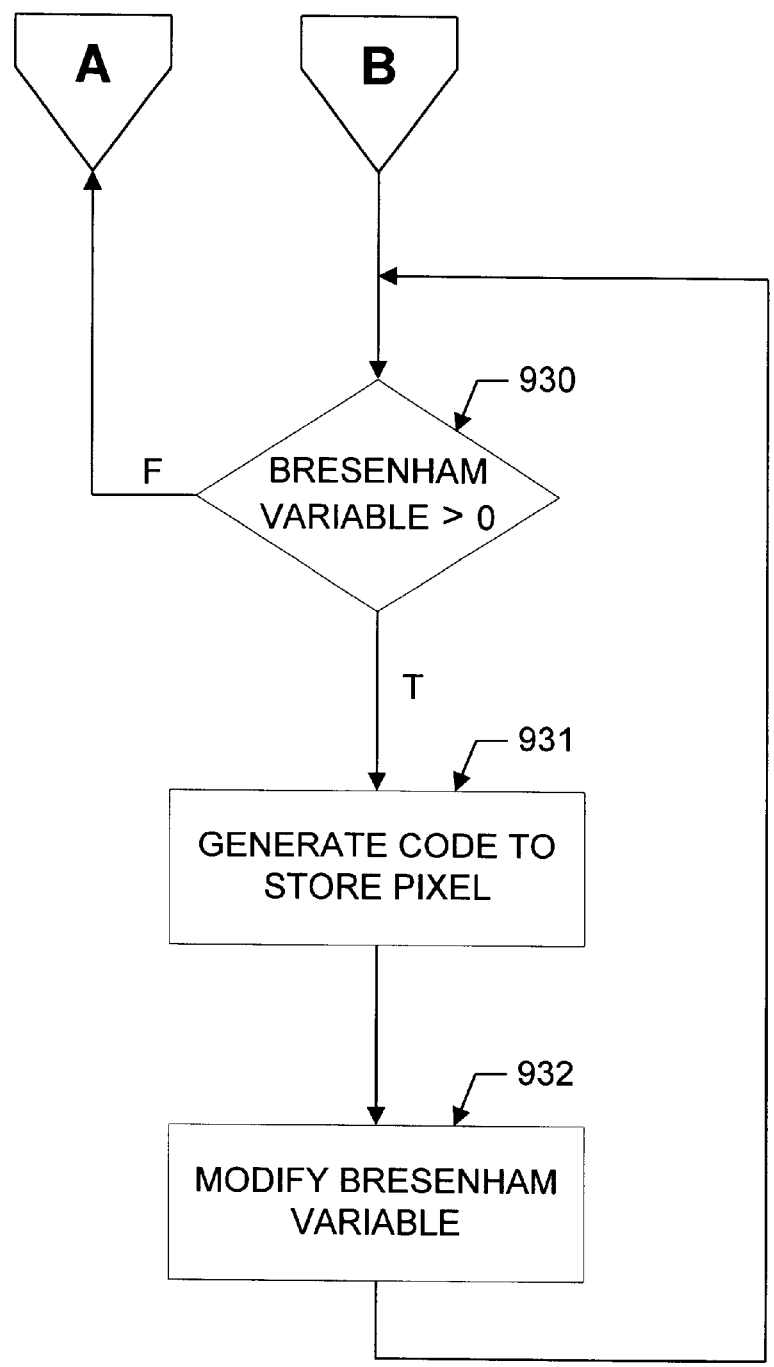
Figure 11A:
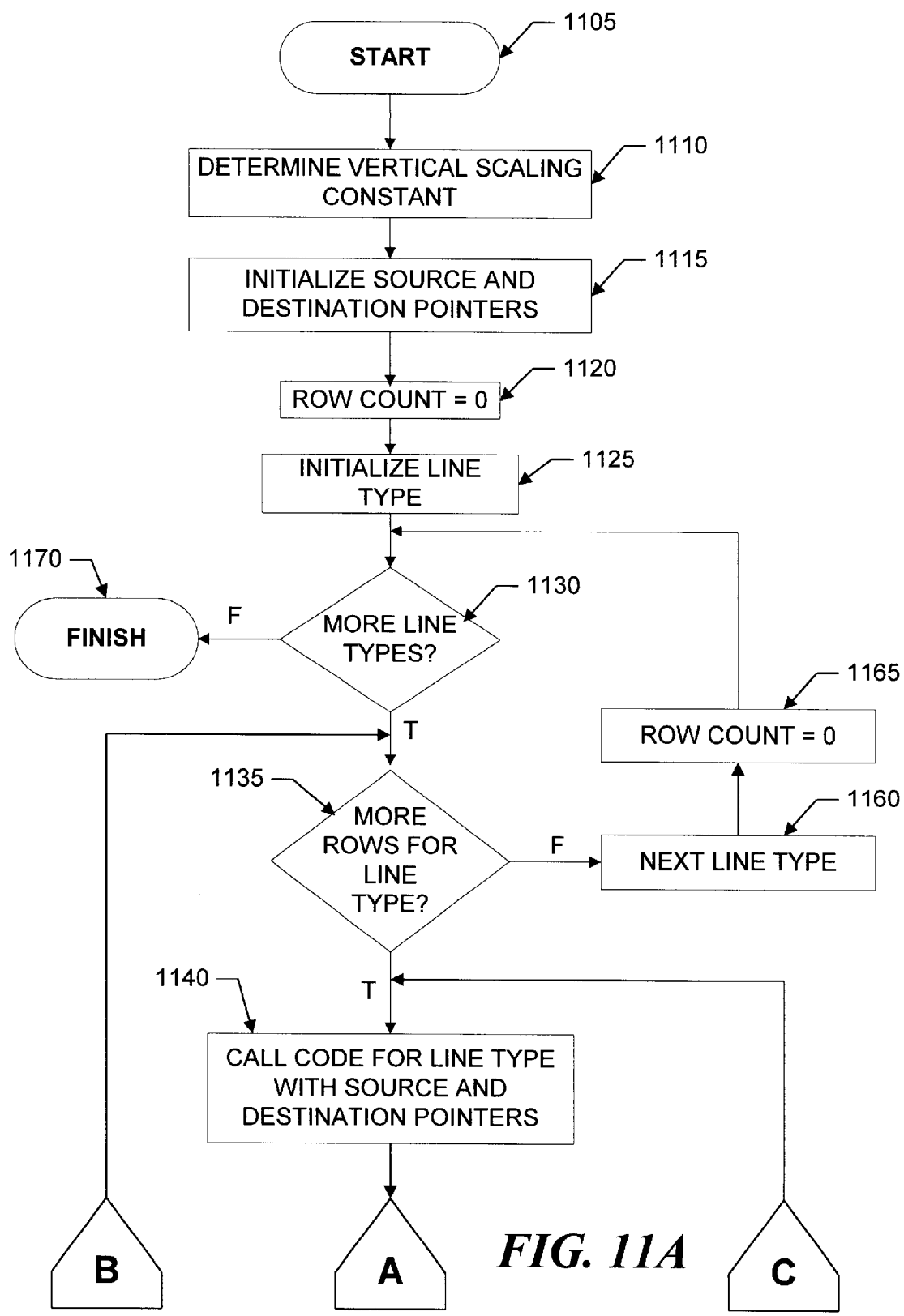
Figure 11B:
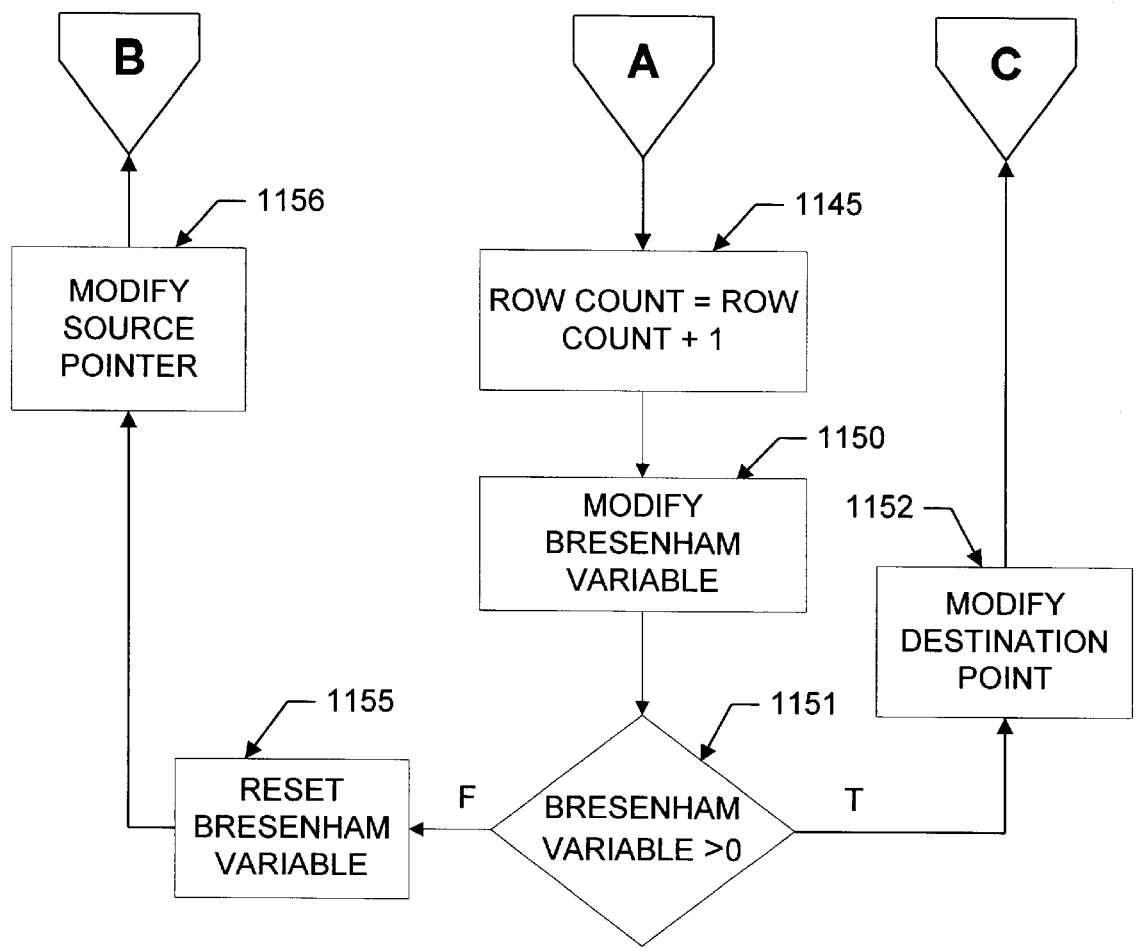

FIGS. 7A–C collectively form a flow chart illustrating a portion of code generating logic of an illustrative embodiment of the invention;

FIG. 8 is a flow chart illustrating another portion of code generating logic of an illustrative embodiment of the invention;

FIGS. 9A–B collectively form a flow chart illustrating yet another portion of code generating logic of an illustrative embodiment of the invention;

FIG. 10 is an illustrative meta description output of an illustrative embodiment of the invention; and FIGS. 11A–B collectively form a flow chart illustrating a portion of an illustrative embodiment of the invention that invokes the generated computer instructions.

DETAILED DESCRIPTION

Figure 3:
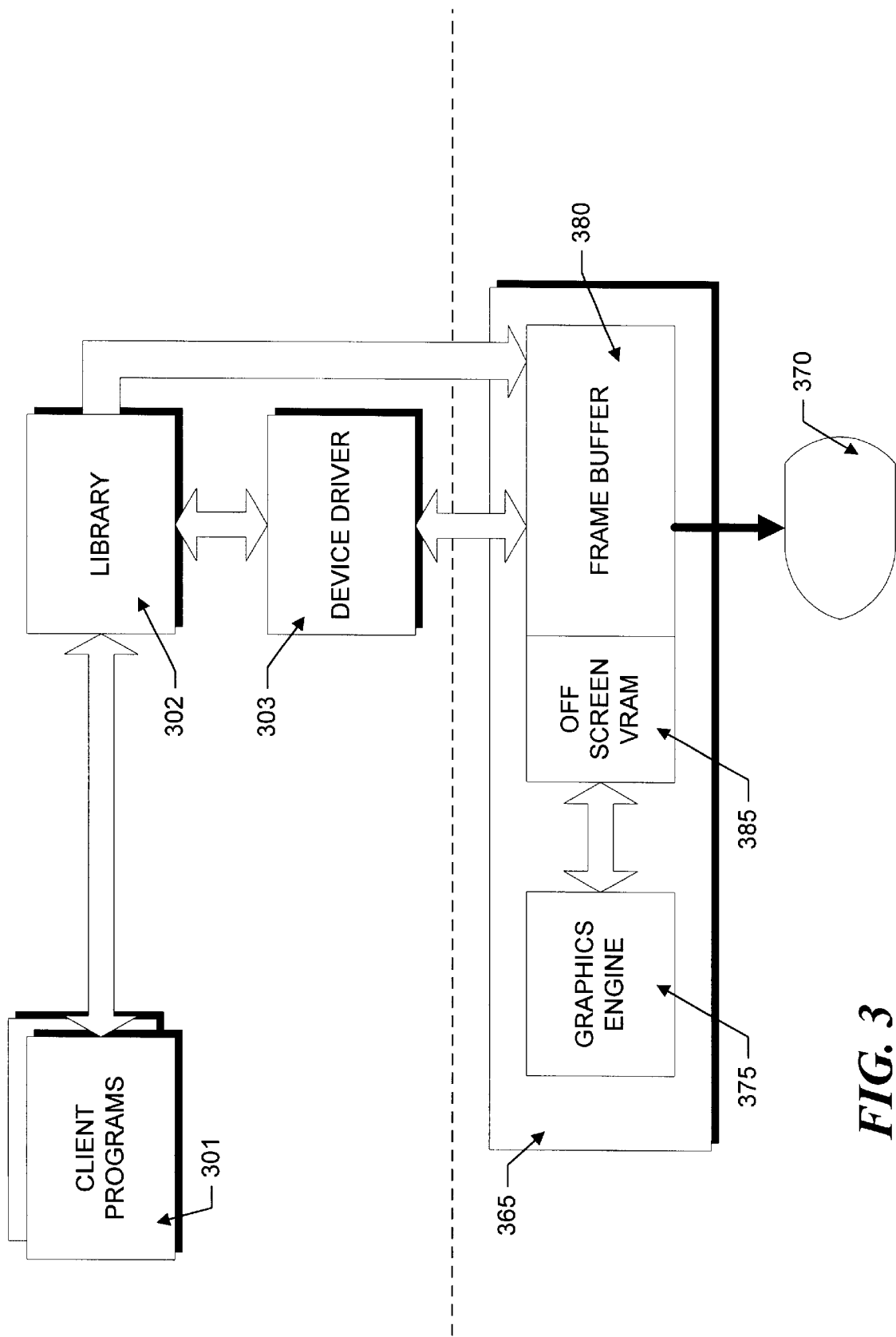
FIG. 3 is a simplified schematic block diagram which illustrates the architecture of an illustrative embodiment of the invention.

FIG. 3 is a schematic diagram of an illustrative embodiment of the invention having software and hardware components. The hardware components include an exemplary controller 365 having a frame buffer 380, which may be scanned by the controller 365 to provide an image on display 370. The exemplary controller 365 may further include an off-screen VRAM 385, which may be used to improve performance using conventional techniques, and may include a graphics engine 375, which may also be used to improve performance using conventional techniques. The hardware components of FIG. 3 are illustrative only. As will be evident from the description below, the novel method and apparatus of the instant invention may be utilized with different video controller architectures, including those without a graphics engine 375 or off-screen VRAM 385.

The software components include client programs 301, video interface library 302, and device driver 303. The client programs 301 may include multimedia software libraries, GUIs, and multimedia applications, such as games. Among other things, the client programs 301 may invoke various routines of the video interface library 302. The routines of video interface library 302, in turn, may communicate with a device driver 303 and with the frame buffer 380.

Device driver 303 is hardware specific software that is responsible for communicating with and controlling controller 365. Such a device driver is generally known in the art.

Video interface library 302 may include routines that may be used by client programs 301. By packaging various features as a video interface library, the various functionality may be localized to the library 302, thereby facilitating development and maintenance of the software performing rapid screen updates.

In the illustrative embodiment, the video interface library 302 includes, among other things, the following routines:

a) a routine to query the capabilities of the display 370 and the device driver 303;

b) routines to open and close a blitter instance.;

c) routines to allow exclusive access to the frame buffer 380;

d) routines to acquire and relinquish buffers of off-screen VRAM 385;

e) a routine to set up a blitter operation; and f) a routine to perform a blitter operation.

Routines (a)–(d) are generally described below, followed by a more specific description of routines (e) and (f). Moreover, routines (a)–(d) are described to provide a context for the description of the use of the present invention, which is partially embodied with routines (e)–(f). Those skilled in the art will appreciate that the present invention is applicable to contexts other than those that provide routines (a)–(d).

A client program 301 may invoke routine (a), among other things, to determine whether certain functions can be performed by controller 365 and to determine the color formats supported by the display 370. In this manner, client program 301 may determine whether color conversion is necessary. For example, if display 370 does not support the color format used by a source image 205 (FIG. 2), color conversion is necessary. By querying the controller 365, client program 301 may use conventional techniques to record the color formats supported by display 370 so that client program 301 may subsequently perform the appropriate steps to ensure target image is converted to a color format supported by the display 370. These queries may be performed, for example, when client program 301 is initializing.

Figure 2:
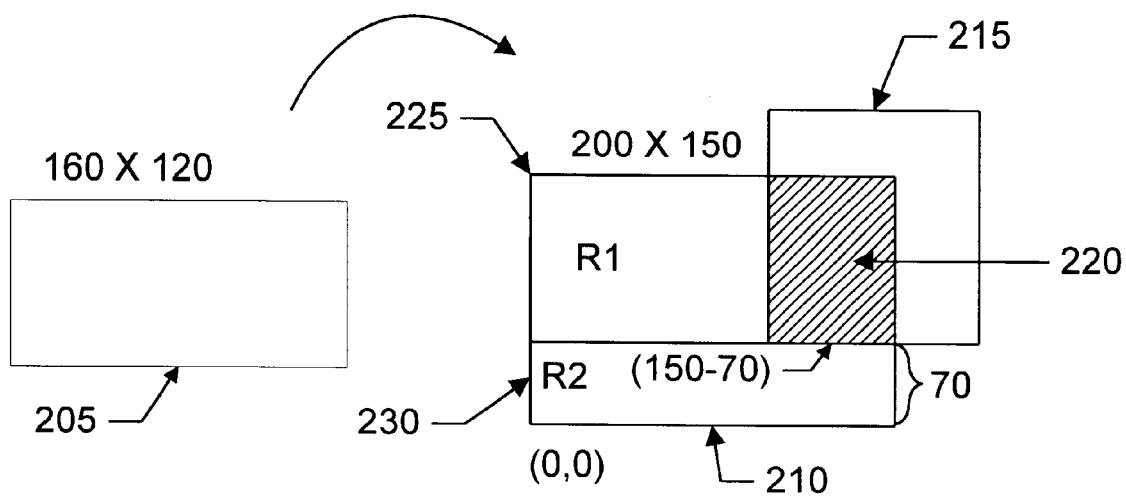
FIG. 2 is a schematic diagram illustrating a target image being scaled and clipped.

Client program 301 may use routines (b) so that video interface library 302 may properly monitor and control requests on a blitter instance basis. Accordingly, other routines, such as routine (d) may perform operations particular to a blitter instance. For example, a given source image 205 may be located at a first position on display 370 (FIG. 3) and may be moved to a second location, scaled, and clipped, to produce a target image 210 (FIG. 2). This movement, scaling and clipping is a blitter instance. By managing operations on a blitter instance basis, as compared to a client program basis, the system may have multiple client programs 301, each potentially involving more than one image. In effect, routines (b) register a blitter instance with the software.

Routines (c) are conventional and may be used so that BLTs are performed as atomic operations. That is, when routines (c) are used, client program 301 will have sole access to the frame buffer 380 until that application yields control. In this manner, requests to the frame buffer 380 may be serialized, and one BLT will not be preempted by another BLT. This is useful, for example, in certain video data formats to ensure proper processing of images.

Routines (d) allow an application to use off-screen VRAM 385. As is known in the art, off-screen VRAM may be used to improve performance. Routines (d) allocate a and relinquish portions of off-screen VRAM 385 so that multiple applications may use this resource.

Routines (e) and (f) include many of the novel aspects of the invention. In order to aid clarity, the use and operation of these routines are first generally described, followed by a detailed description of their implementation. Generally, routines (e) and (f) may be used by client programs 301 to perform a BLT operation in two parts: first, the blitter operation is set-up, and second, the image data is actually transferred.

Setting up the blitter, i.e., the first part, involves recording the desired characteristics of a target image 210 (FIG. 2) and describing certain characteristics of a source image 205. The blitter set-up operation also involves generating computer instructions, which when executed by the CPU 105 (FIG. 1) cause the actual, desired data transfer, or BLT, to occur. In the illustrative embodiment, the generated computer instructions are associated according to line types of the target image. For example, referring to FIG. 2, target image 210 comprises a first visible rectangle R1 and a second visible rectangle R2. A first set of computer instructions will be generated for a first line type, corresponding to first rectangle R1, and a second set of instructions will be generated for a second line type, corresponding to the second rectangle R2.

Transferring the data, i.e., the second part, involves invoking the generated instructions at an appropriate time. In the illustrative embodiment, the generated instructions are invoked in accordance with a data structure, described below, that is also generated as part of the blitter set up operation. The data structure is used to ensure that the computer instructions for the various line types are invoked for the appropriate number of times. For example, referring to the example of FIG. 2, the computer instructions for the first line type will be invoked for each row of the target image corresponding to rectangle R1.

Significant performance advantages may be attained by performing the BLT in two parts. To begin with, a set-up. blitter operation, i.e., routine (e), needs to be performed relatively infrequently. For example, a blitter operation may need to be set up as part of the initialization of the underlying client program 301. Likewise, a set up may be needed because a user has relocated or re-sized a target image on display with the mouse 157, or because the underlying client program 301 or another application has caused another image 215 (FIG. 2) to clip a portion of the first image 210 (FIG. 2). In contrast, the actual data transfers, i.e., routine (f) need to occur relatively frequently, fifteen to thirty times per second or more. Consequently, by generating the computer instructions during the set-up blitter operation, the performance-sensitive, actual data transfer is not unnecessarily delayed.

The implementation and construction of the routines (e) and (f) are described in more detail below. First, routine (e) and its associated data structures are described, followed by a description of routine (f). In the illustrative embodiment, the blitter operations occur on a blitter instance basis. To this end, routine (b), when opening a blitter instance, creates the exemplary data structure 400 of FIG. 4. The set up blitter routine (e) uses the data structure 400 to record certain information and to generate computer instructions, as described below. In the illustrative embodiment, the data structure 400 is implemented as a structure in the C programming language. However, other programming languages and data structures may be easily substituted.

Data structure 400 comprises several components. Source color format 405 indicates the color format of the source image 205 (FIG. 2). As suggested above, there are several known color formats, some of which may not be supported by the display being used. Source width 410 and source height 415 describe the size, in pixels, of the source image 205. Referring to FIG. 2, source image 205 has a width of 160 pixels and a height of 120 pixels. Source position 420, in combination with source width 410 and source height 415, indicates the portion of a source image 205 (FIG. 2) to be transferred. In this regard, it may include an entire image or subimage, such as a .zoomed. image. Source position 420 is conventional (x,y) addressing, which is used in conjunction with a base address to the associated buffer, to locate the image within off-screen VRAM 185 (FIG. 1) or within RAM 106. Destination color format 425 indicates the color format for target image 210 (FIG. 2). As outlined above, this may be different than the color format of the source image 205.

Destination width 430 and destination height 435 describe the size, in pixels, of target image 210 (FIG. 2). For example, referring to FIG. 2, target image 210 has a width of 200 pixels and a height of 150 pixels.

Figure 6A:
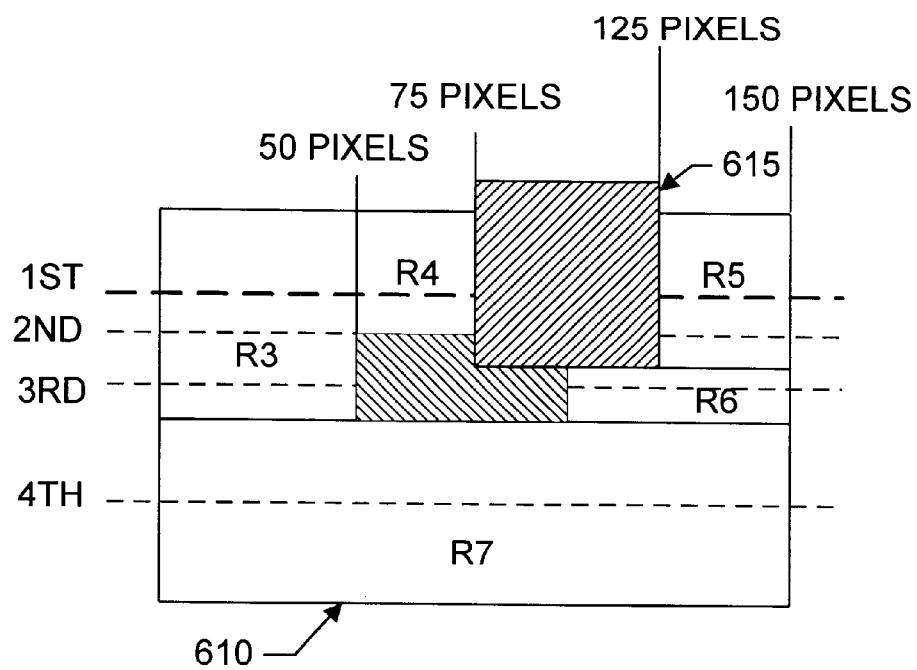
FIG. 6A is a schematic diagram illustrating a target image being scaled and clipped.
Figure 6B:
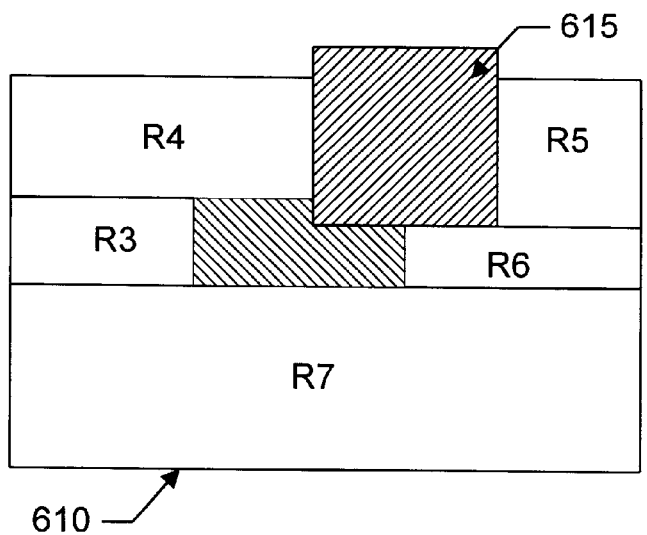
FIG. 6B is a schematic diagram illustrating an alternative arrangement of visible rectangles.

Destination position 440 indicates that the position on display 370 (FIG. 3) where the target image 210 (FIG. 2) should be displayed. Similarly to that discussed above with regard to source position 420, this is described using the conventional (x,y) addressing. The number of visible rectangles 445 indicates the number of rectangles comprising the visible portion of target image 210 (FIG. 2). In the example of FIG. 2, there are two visible rectangles, R1 and R2. In the example of FIG. 6, there are five visible rectangles, R3–R7.

Component 450 is a pointer to an array of rectangle descriptors for the visible rectangles. A visible rectangle may be described in many ways, for example, by providing the (x,y) coordinates of diagonally opposite corners of the rectangle. In an illustrative embodiment, however, the rectangles are described by providing the (x,y) coordinates of a lower left corner of the visible rectangle and by providing an x and a y extent. In the illustrative embodiment, other software such as Presentation Manager (PM) and Multimedia Presentation Manager/2 (MMPM/2), both packaged with the OS/2 operating system and available from IBM Corp., provide the information describing the visible rectangles to client programs 301 (FIG. 3), which in turn inform the library 302.

Besides recording a description of the blitter operation to be performed, the set up blitter routine (e) invokes computer instruction generating logic, described below, which uses exemplary data structure 400 to generate the computer instructions (more particularly, machine code) which, when executed by CPU 105 (FIG. 1), causes the actual data transfer comprising the blitter operation to occur. In an illustrative embodiment, the computer instruction generating logic comprises a plurality of software routines called by the set-up blitter routine (e).

A first portion of the code generating logic analyzes exemplary data structure 400 (FIG. 4) and constructs a description of the various line types of the target image. Each line type comprises visible and non-visible runs. A second portion of the logic uses the line-type description provided by the first portion and constructs an in-line machine code sequences for that line type. The machine code sequence will incorporate the appropriate instructions to provide for horizontal scaling and color conversion, if necessary.

Figure 4:
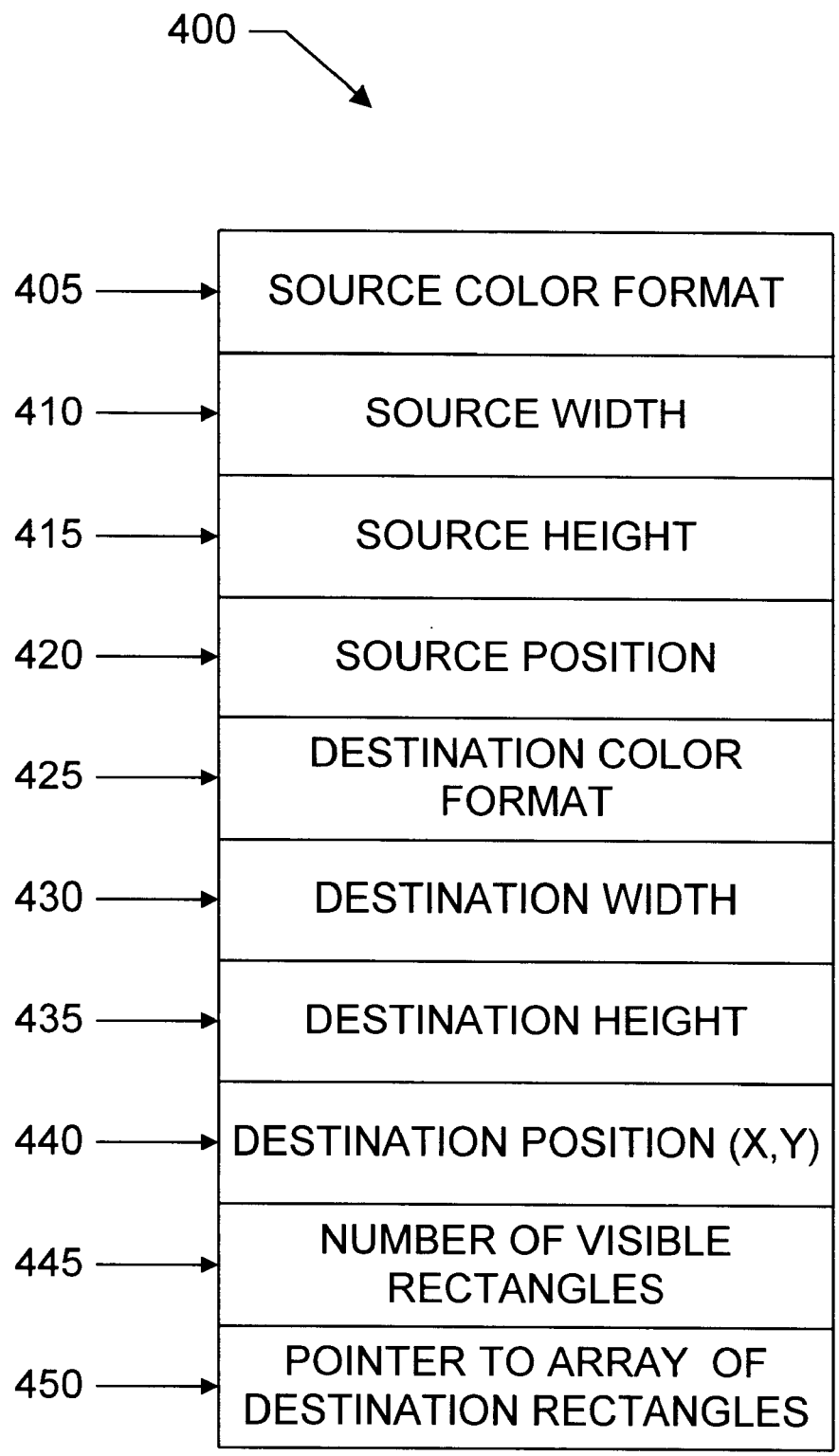
FIG. 4 is a diagram describing a data structure of an illustrative embodiment of the invention.

Line types were briefly described above with reference to the simple example of FIG. 2. In that example, a given line type corresponded to a single visible rectangle. Line types, however, may also be associated with multiple visible rectangles. For example, referring to FIG. 6, a target image 610 is overlaid by two images 615 and 620 and comprises visible rectangles R3–R7. A first line type for this example would span rectangles R3–R5; a second would span R3 and R5; a third would span R3 and R6; and a fourth would span R7. The visible rectangles R3–R7 are described by rectangle descriptors, pointed to by component 450 of data structure 400 (FIG. 4).

FIGS. 7A–C collectively form a flow chart describing an illustrative embodiment of the first portion of code-generating logic, which constructs the line type descriptions given the information provided by data structure 400. The description of FIGS. 7A–B is provided with reference to the example of FIG. 6.

The routine begins with step 705 and proceeds to step 710, in which a variable Row Count is initialized to zero. For purposes of this description, row zero refers to the upper-most row. In step 711, a variable Repeat Row is initialized to zero. The flow proceeds to step 715, in which the Row Count is compared to the variable Number of Rows of Target Image which is stored in component 435 of data structure 400 (FIG. 4).

Assuming that the last row is not being operated upon, the flow proceeds to step 720, in which a variable Visible is initialized to .True. A variable Run Count is initialized to zero in step 725, and a variable Column Count is initialized to zero in step 730.

In step 735, the variable Column Count is compared with the variable Number of Columns of Target Image, which is stored in component 430 of data structure 400 (FIG. 4). Assuming that the end of the row is not encountered, i.e., that the column count is not equal to the number of columns of the target image, the flow program proceeds to step 740, in which a variable Run Length. is set equal to the variable by Number of Consecutive Visible Pixels in Rectangle.

Run length indicates the number of consecutive pixels in the instant visible rectangle. (As will be described below, it is also used to indicate the number of consecutive non-visible pixels). Referring to FIG. 6, the first visible rectangle encountered is R3, which is 50 pixels wide; as such, run length will equal 50. The value of the variable Number of Consecutive Visible Pixels in Rectangle is calculated by a routine that determines the number of consecutive pixels by analyzing the rectangle descriptors (pointed to by component 450 (FIG. 4) of data structure 400).

Next, in step 745, Run Length is compared to zero. In the instant case of FIG. 6, this comparison results in a "False" value, and as such, the program flow proceeds to step 750. However, if in the example, the upper-most left corner of a target image is clipped, Run Length would equal zero and a "True" value would result from the comparison.

Step 750 determines whether the Visible variable is True or False. In the instant example, Visible is still True, as set in step 720. Consequently, program flow proceeds to step 755, in which the Run Count variable is updated by adding the prior Run Count value (which is still initialized to zero at this point) to the Run Length value (which is 50). Thus, in the instant example, the calculation results in Run Count value equaling 50.

Program flow proceeds to step 760, in which the Column Count variable is set equal to the sum of the Column Count value (still initialized to zero at this point) plus the current Run Length value. In the instant example, Column Count equals 50, indicating that the first portion of the computer instruction generating logic has progressed across the first row up to the boundary of visible rectangles R3 and R4.

Program flow proceeds back to step 735, in which Column Count value is compared to the Number of Columns of the Target Image value. In the instant example the end of the current row is not yet reached, so the steps described above are repeated. With the next iteration, in step 740 Run Length is set to 25, i.e., the width of visible rectangle R4, and, in step 755 Run Count is set to 75. In step 760 Column Count is again updated, this time to 75, i.e., the right-most edge of rectangle R4.

Program flow then proceeds back to step 735, which again determines that the end of the row of the target image has not yet been reached. With this iteration, however, in step 740 Run Length is set equal to zero, as the pixels 76–125 of row zero of the target image 610 are non-visible. As such, step 745 results in a True value, and the process proceeds to step 765.

In step 765, Run Length is set equal to the Number of Consecutive Non-visible Pixels. In the instant example, this will result in a value of 50, i.e., the width of image 615. In the illustrative embodiment, this is determined by analyzing the rectangle descriptors pointed to component 450 of data structure 400 (FIG. 4). That is, there is no data structure describing invisible rectangles.

Figure 5:
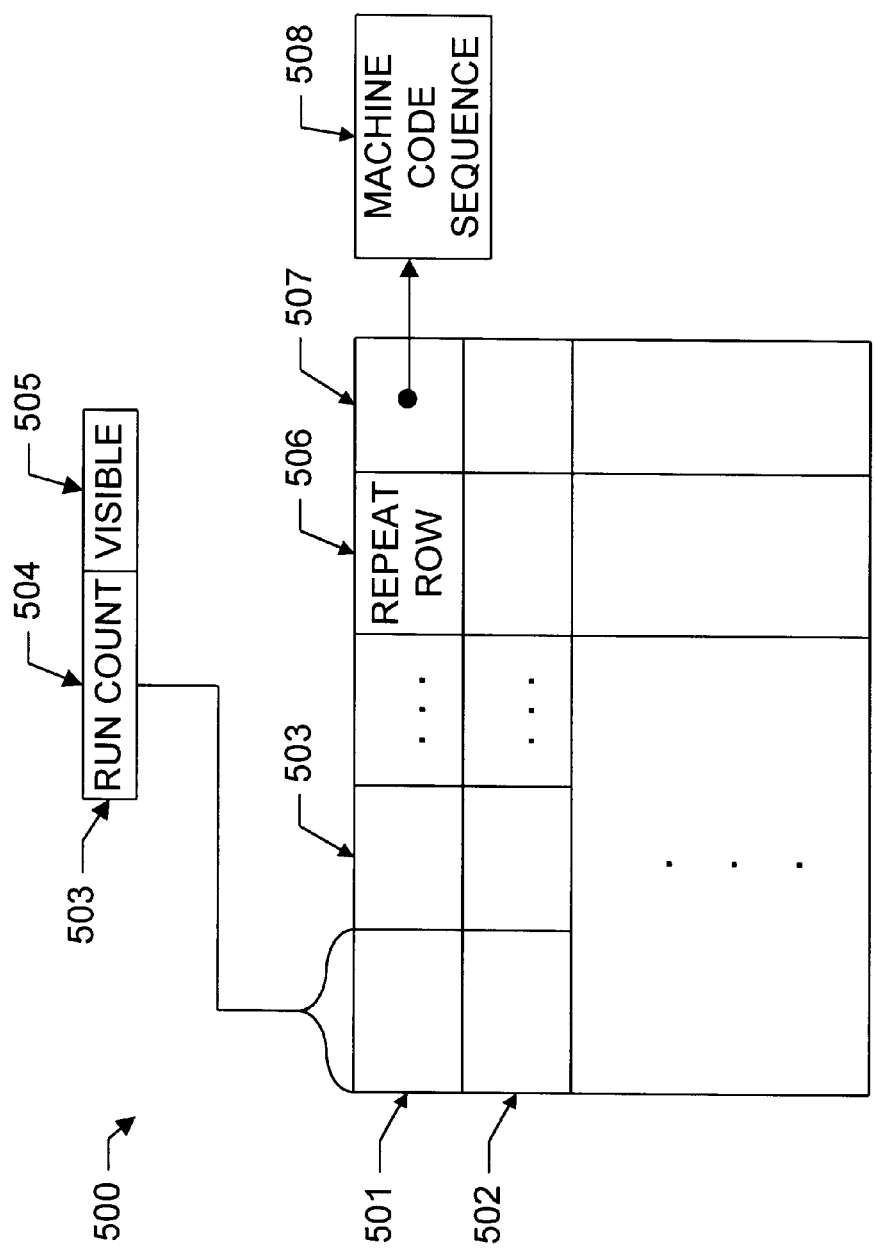
FIG. 5 is a diagram describing another data structure of an illustrative embodiment of the invention.

Program flow proceeds to step 770, which determines whether Visible is true or false. In the instant example, Visible is still set to true. In step 775, the Run Count is stored in a data structure, such as an array of structures 500 (FIG. 5). A row element 501 of the array 500 corresponds to a line type. An element 503 of the row element 501 is used to store the Run Count 504 and whether or not the run is visible 505.

Once the run count is stored, the flow proceeds to step 780, in which Run Count is set to the value of Run Length, to the run length of non-visible pixels, in this case 50. Visible is then set to False, in step 785, and in step 760, Column Count, is set to the sum of the prior Column Count value and the Run Length value resulting in a value of 125.

In step 735, a determination is made as to whether or not the end of the row of the target image 610 has been reached. Since the end of the row has still not been reached, Run Length is set equal to the number of consecutive visible pixels in rectangle R5, i.e., 25, in step 740.

In step 745 Run Length is again compared to zero. Since Run Length is now non-zero, process flow proceeds to step 750. Since Visible is still set to False, flow proceeds to step 751.

In step 751 Run Count and the variable Visible are stored in the array 500, indicating that a span of 50 non-visible pixels of target image 610 was next encountered in analyzing the target image 610.

In step 752 Run Count is set equal to Run Length, i.e., 25. In step 753, Visible is set to True. Process flow then proceeds to step 760, in which Column Count is set to 150, i.e., the end of row zero of target image 610.

Process flow proceeds back to step 735, in which a determination is made that the end of the row has been reached. As such, the flow proceeds to step 736, which determines whether Visible is True or False. In the instant example, Visible is True and the flow proceeds to step 737, which stores Run Count and Visible in array 500, indicating that a span of 25 visible pixels was encountered. If, however, the example was similar to FIG. 2 and an image clipped the upper-most right corner of the target image 610, process flow would proceed to step 738, rather than step 737, and the last item stored in the array would indicate Run Count as corresponding to a span of non-visible pixels. Consequently, before step 706 is encountered, a description has been recorded in the row element 501 of array 500 for the first row, i.e., the first line type. In the example of FIG. 6, this description would indicate that the first line type comprised a span of 75 visible pixels, followed by a span of 50 non-visible pixels, followed by a span of 25 visible pixels.

The flow proceeds to step 706, which determines whether the next row, i.e., row 1, is the same as the current row, i.e., row 0. This is done by comparing the Row Count of the current row, with the Row Count of a preceding row. Step 707 calculates a variable Repeat Row. indicating the number of rows that have a similar description to that for the current line type. In the instant example of FIG. 6, Repeat Row will obtain a value corresponding to the row number for the lower left corner of rectangle R4, as all of these rows have the same line type, i.e., the same description in terms of visible and non-visible pixels.

After Repeat Row is determined, the flow proceeds to step 708, which stores the Repeat Row value in an element 506 of row element 501 (FIG. 5). As such, the description within the array 500, thus far, indicates that a first line type has 75 visible pixels, followed by 50 invisible pixels, followed 25 visible pixels, and that this sequence is repeated for a number of rows 506 equal to the row of the lower left corner of visible rectangle R4.

In step 709, Row Count is updated to the row corresponding to the lower left corner of visible rectangle R4, and the flow proceeds back to step 711. The process is then repeated for the next line type and so on, producing descriptions for a second line type, third line type, and fourth line type of the example of FIG. 6.

Upon finishing the processing the fourth line type, the row count indicates that the last row of the target image 610 has been processed. As such, upon reaching step 715, the comparison yields a True value, and the flow will end in step 795.

The logic of FIG. 7 also handles alternative methods of describing visible rectangles. For example, the software responsible for maintaining the visible rectangle description, e.g., PM, may arrange the visible rectangles such that visible rectangles are horizontally contiguous. Such an arrangement may provide a visible rectangle description similar to FIG. 6B.

Figure 1:
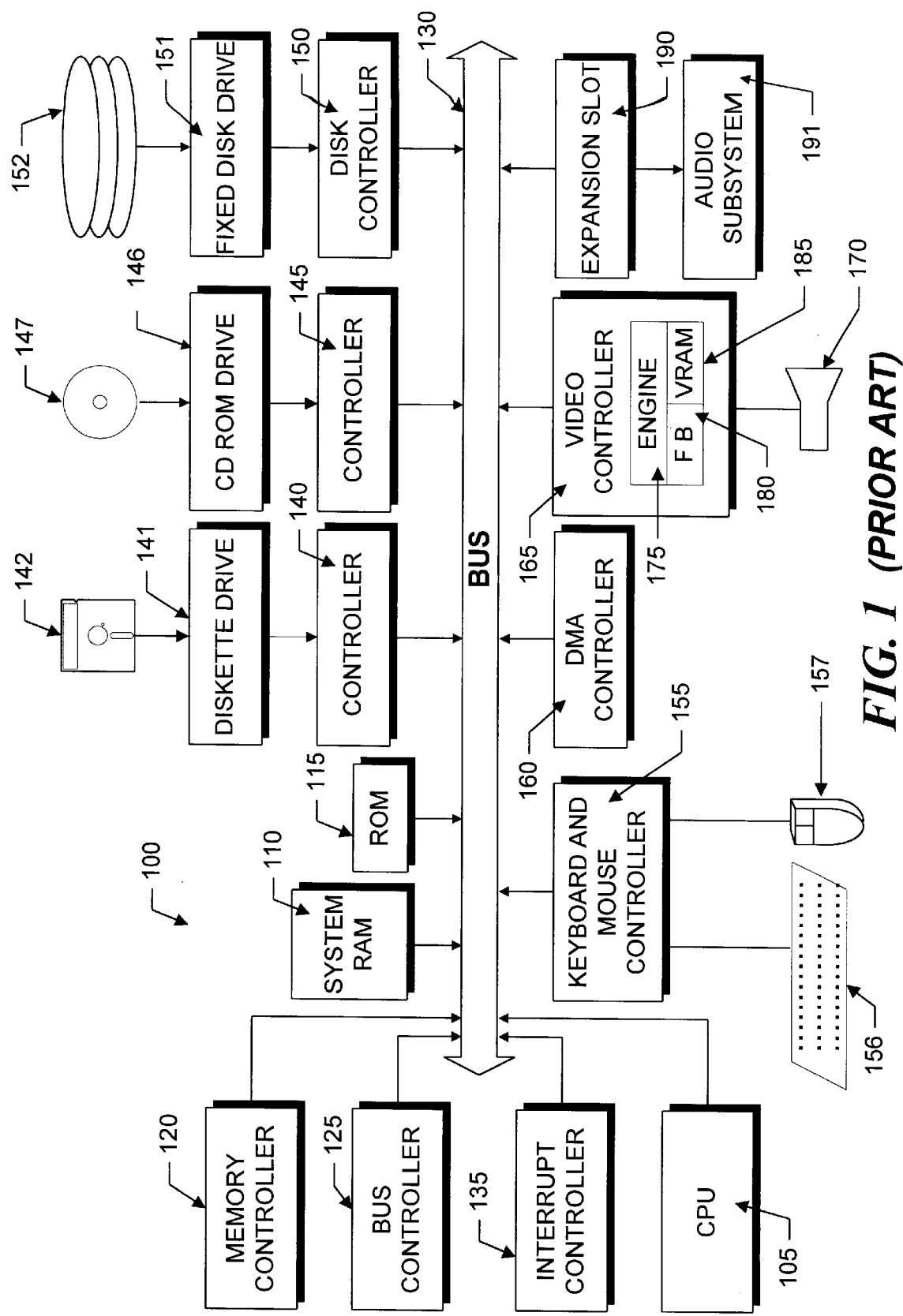
FIG. 1 is a schematic block diagram of a conventional computer system.

FIG. 8 is a flow chart of an illustrative embodiment of the second portion of code-generating logic, which utilizes the line type description stored in array 500 to generate computer instructions in the form of machine code sequences for CPU 105 (FIG. 1). The flow begins in step 805 and proceeds to step 810, which determines whether there are more line types to process. This determination may be made by analyzing array 500 (FIG. 5). If there are more line types, the flow proceeds to step 815, which generates computer instructions, which when executed generate a stack frame. Stack frames are known in the art and are used to temporarily store the contents of registers of CPU 105 (FIG. 1) and the like so that those hardware resources may be used and subsequently restored to their prior state. Those skilled in the art will appreciate that the actual machine code sequence needed for generating a stack frame depends upon the actual CPU 105 being used.

The flow proceeds to step 820, which determines whether the target image is wider than the source image, i.e., whether horizontal scaling is necessary. This determination may be made by using components 410 and 430 of data structure 400 (FIG. 4). If the target image is wider, the flow proceeds to step 825, which generates a machine code sequence to scale-up the source image. If the target image is narrower than the source image, the flow proceeds to step 830, which generates a machine code sequence for scaling down the source image. The flow then proceeds to step 835, which generates a machine code sequence for popping the contents off the stack into the registers of CPU 105 (FIG. 1).

This process is repeated until all the line types have been processed. The flow then proceeds to step 840 to end the flow.

FIG. 9 is a flow chart of an illustrative embodiment of that portion of the code-generating logic of FIG. 8 that generates machine code to scale-up a horizontal line of the source image. The flow begins in step 905 and proceeds to step 906 which allocates a portion 508 (FIG. 5) of RAM 110 (FIG. 1), in which to store the machine code sequence that is to be generated. Allocating a portion of RAM is known in the art. An address pointer to this allocated portion of RAM is stored in element 507 of row element 501 (FIG. 5).

The flow process proceeds to step 910, in which a determination is made whether there are more runs for the instant line type. This determination may be made by analyzing the array 500 (FIG. 5). Assuming that there are more runs, the flow proceeds to step 915, which determines whether the run is visible. If the run is visible, the flow proceeds to step 920.

Step 920 determines whether the end of the run has been reached. Assuming that this is not the case, the flow proceeds to step 925, which generates machine code to load a source pixel, in a CPU register, for example, and to perform color conversion of that pixel, if necessary. Generally, this involves generating a series of MOVE. or similar CPU instructions, using a pointer to a buffer for storing the source image. Generally, the pointer to the source buffer, which is used by the MOVE instructions, comprises a base pointer to the beginning of the row being processed and an index into the row. The index will depend upon the pixel of the row being processed and the size of a pixel.

As such, when a machine code sequence is later invoked, a base pointer to the row being blitted will be passed to the code sequence. For example, when the first row is being blitted, a base pointer to the first row of the source and target buffers are passed to the code sequence (i.e., the function for this line type). These initial base pointers, in turn, are stored in data structure 400 of FIG. 4. Pointers for subsequent rows may be easily calculated given the information stored in data structure 400.

If color conversion is determined to be necessary, step 925 also generates the appropriate machine code instructions to color convert the source pixel. As is known in the art, for certain color conversions, this may be performed by indexing a color conversion look-up table using the data of the source pixel as an index. In other cases, a look-up table is impractical, and conventional color conversion algorithms may be used.

The flow then proceeds to step 930. As is known in the art, scaling-up an image involves replicating certain pixels. For example, in the case of a 5:4 horizontal scale ratio, every fourth pixel of the source image is replicated, so that 5 target pixels are formed from 4 source pixels. An illustrative embodiment utilizes Bresenham variables techniques (Bresenham variables are known in the art). The Bresenham variable is shifted in integer space to keep all of the arithmetic operations needed to perform scaling as integer operations (as opposed to floating point, for example). For example, the actual scaling factor between the images may be multiplied by a predefined constant, such as 64K. Step 930 tests the Bresenham variable for horizontal scaling. If the Bresenham variable is positive the flow proceeds to step 931, which generates code to store the loaded pixel, that is, to move the pixel stored in a register, for example, to the appropriate location in the target buffer. The Bresenham variable is then modified in step 932, for example by subtracting the predefined constant, and the flow proceeds back to step 930 to repeat the flow. Step 931 will thus be invoked an appropriate number of times to replicate the store operation, thus replicating the source pixel, thus implementing the scaling.

When the step 931 has been invoked the appropriate number of times to generate the .store code. to implement the horizontal scaling, the flow proceeds to step 933 to reset the Bresenham variable and then back to step 920, which again determines whether the end of the run has been reached. Assuming that the end of the run is reached in step 920, the flow proceeds to step 910, which determines whether there are more runs for this line type. Assuming that there are more runs, the flow proceeds to step 915, which again determines whether or not the run is visible. Assuming that the next run is non-visible, as was the case for the example of FIG. 6, the flow proceeds to step 935 which skips the non-visible pixels. More particularly, step 935 updates the indexes into the source and target buffer, in accordance with the scaling factor, to skip the non-visible run, so that if further instructions need to be generated for this line type, the indexes to the source and target buffers are correct.

The flow proceeds back to step 910, which again determines whether there are more runs for this line type. If there are, the process as described above is repeated. Assuming that there are no more runs, the flow proceeds to step 940 which ends the flow.

Those skilled in the art will appreciate that the actual machine code sequence that is generated will depend upon the underlying CPU 105 (FIG. 1). For illustrative purposes only, a sample meta. description of the generated instructions is provided in FIG. 10. This meta description indicates, with a certain understandable level of abstraction, the types of instructions generated. For example, FIG. 10 indicates a .Load a Source Pixel. operation. Those skilled in the art will appreciate that for certain types of CPUs this meta operation will involve moving a pixel from a source buffer into a register of CPU 105 (FIG. 1). Likewise, skilled artisans will appreciate that .Convert Pixel to Destination Format. involves color converting that pixel, and that Store Destination Pixel. involves transferring the color converted pixel from a register of CPU 105 to a target buffer. In certain instances, .Store Destination Pixel. is repeated to implement scaling, as described above. Moreover, skilled artisans will appreciate that the .Storing. and .Loading. operations may include the appropriate machine code to update the indexes to the respective buffers being used. These exemplary sequences are repeated to form in-line code for the entire line type for which instructions are being generated.

The flow that is necessary to generate scaled down code, according to step 830 of FIG. 8, is similar to that of FIG. 9. The essential difference between the two being that scaling down involves skipping certain pixels of the source image, rather than replicating source pixels.

The illustrative embodiment described above uses an array 500 of structures 501, each structure 501 having a component 506 for a repeat row value and each having an array of other structures 503, which have a Run Count 504 and a Boolean variable 505 indicating whether or not the run is visible. In addition, each structure 501 includes a pointer to a machine code sequence 508, corresponding to that line type. Those skilled in the art will appreciate that other data structure arrangements may be easily substituted for array 500.

Thus, the set up blitter routine (e) generates an array 500 (FIG. 5) that describes each line type in terms of visible and non-visible runs. The array includes a component 501 for each line type, and each component 501 includes an element 506 indicating how many rows are covered by that line type. In addition, each line type component 501 includes a pointer 507 to a machine code sequence 508 for that line type.

The implementation of blitter routine (f) is now described in detail. Client programs 301 (FIG. 3) may use conventional techniques to ensure that the source data is blitted, via blitter routine (f), at the appropriate rate.

FIGS. 11 A–B collectively form a flow chart of an illustrative embodiment of blitter routine (f). The flow begins in step 1105 and proceeds to step 1110, which determines the vertical scaling constant between the source and target image. That is, similar to that described above with reference to FIGS. 9A–B, vertical scaling likewise uses Bresenham variable techniques, using purely integer operations.

The flow proceeds to step 1115, which initializes the source and destination pointers. The initial values, as outlined above, may be determined from the data stored in data structure 400 (FIG. 4). As outlined above, the source and target data may be stored in RAM 110, off-screen VRAM 185, or frame buffer 180 (FIG. 1).

The flow proceeds to step 1120, which initializes a variable Row Count, and to step 1125, which initializes a pointer to a line type, i.e., selects a row component 501 of array 500 (FIG. 5). For example, this may point to row element 501, which corresponds to the first line type.

The flow proceeds to step 1130, which determines whether more line types need to be processed. Assuming that this is true, the flow proceeds to step 1135. Step 1135, in turn, determines whether more rows need to be processed for the instant line type being processed. This determination may be made by comparing Row Count with the repeat row value 506 stored in row element 501 of array 500 (FIG. 5).

Assuming more rows need to be processed, the flow proceeds to step 1140, which invokes the machine code sequence, i.e., the function, for the instant line type. This invocation is made by preparing a call frame, e.g., pushing the source and destination pointers (i.e., pointers to the beginning of the row being processed of the source and target images) on a stack in a predefined location of RAM 110, as function parameters, and calling the function for that line type, thus setting the instruction pointer of CPU 105 (FIG. 1) equal to the pointer value 507 for that line type. Likewise, alternative calling conventions may be easily substituted. As such the machine code sequence, described above, when executed, will perform the appropriate loads, converts, and stores to horizontally scale, color convert, and clip the portion of the source image pointed to by the source pointer, as described above. This machine code sequence, as described above, will include the appropriate instructions to push and pop values on a stack so that none of the resources are corrupted. After the machine code sequence has blitted the row, the sequence returns control to the blitter routine (f).

The flow proceeds to step 1145, which updates the row count, and then to step 1150. Step 1150 modifies the Bresenham variable similarly to that discussed above. Step 1151 then tests the Bresenham variable, and if it is positive the flow proceeds to step 1152, which modifies the destination pointer, i.e., incrementing the pointer to the next row of the target buffer. The flow then proceeds back to step 1140, which as explained above, transfers a line from the source buffer to the target buffer with the appropriate color conversion. In this fashion, the source line is replicated the appropriate number of times by causing the destination pointer to be modified, while retaining the pointer to the source buffer unchanged.

Eventually step 1150 will be invoked the appropriate number of times to implement the vertical scaling, and the Bresenham variable will be detected as negative in step 1151. The flow will then proceed to step 1155 to reset the Bresenham variable, and then to step 1156. Step 1156 will update the source pointer, as the source pointer will have been replicated the appropriate number of time to implement the vertical scaling, and the flow will proceed back to step 1135.

Step 1135 again determines whether all of the rows associated with that line type have been processed. If all rows have not been processed, the procedure described above is repeated. If all rows have been processed, the flow proceeds to step 1160.

Step 1160 updates the line type, so that, for example, the line type associated with row element 502 of array 500 (FIG. 5) is utilized. The flow then proceeds to step 1165, which resets the row count.

The flow proceeds back to step 1130, which again determines whether or not all line types have been processed. Assuming that all line types have been processed, the flow proceeds to step 1170, which ends the flow.

As is evident from the description above, an illustrative embodiment generates machine code sequences 508 (FIG. 5) for blitting a row at a time. As such, the blitter routine (f) includes some complexity of ensuring that the sequence 508 is invoked the appropriate number of times and for ensuring that vertical scaling is implemented. Another embodiment is contemplated in which a machine code sequence is generated for all of the rows of the blitter operation, rather than just for a line type at a time. This embodiment would add some additional complexity to the set up blitter routine (f) as it would need to implement additional functionality and would increase the amount of memory that would need to be allocated. Such an implementation may improve the performance of the blitter routine (f) in some systems, depending upon cache sizes and other architectural variables known in the art.

The foregoing description has been focused upon an illustrative embodiment, and certain variations, of the invention. Other variations and modifications, however, may be made to this embodiment, which will attain some or all of the advantages of the invention. It is, therefore object of the appended claims to cover all such variations and modifications that come within the true spirit and scope of the invention. In this regard, it is especially noted that the instant invention may be used with various video controller architectures, including those that may provide hardware support for some or all of the image operations described above. Given the description above, those skilled in the art will be able to readily modify the routines to take advantage of such architectures. For example, if a graphics engine of a video controller provides support for scaling, the querying routine (a) described above will be able to determine this. The set up blitter routine (e) thus will not need to generate computer instructions to perform scaling and instead will cause the graphics engine to perform the scaling operation.

In an alternate embodiment, the invention may be implemented as a computer program product for use with a computer system. Such implementation may comprise a series of computer readable instructions either fixed on a tangible medium, such as a computer readable media, e.g. diskette 142, CD-ROM 147, ROM 11 5, or fixed disk 152 (FIG. 1), or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein with respect to the invention. Those skilled in the art will appreciate that such computer readable instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed from a server or electronic bulletin board over a network, e.g., the Internet or World Wide Web.

What is claimed is:

1. Apparatus for performing blitter operations to transfer data corresponding to pixels of a source image to a target buffer for holding data for a target image to be displayed on a monitor, the blitter operation being defined by a blitter description, which includes information describing sizes of the source and target images, color formats of the source and target images, and further describes the target image in terms of at least one visible rectangle, the apparatus comprising:

means, responsive to a request to modify the blitter description, for modifying the blitter description;

means, responsive to the modifying means, for creating a line-type description of the target image form the visible rectangle description of the target image, the line-type description comprising at least one run of pixels defined by visible and non-visible pixel states, the line-type description further comprising a repeat count indicating the number of lines of the target image corresponding to the line-type description;

means, responsive to the creating means, for generating a machine code sequence to be associated with the line-type description, the machine code sequence including machine code instructions to move and process data that are defined by visible runs of the line type description; and means, responsive to the generating means, for executing the machine code sequence, in accordance with the line-type description, the machine code sequence being invoked a number of times equal to the repeat count of the line-type description so as to transfer the data corresponding to the pixels of a source image to the target buffer in accordance with the modified blitter description during the blitter operation.

2. The apparatus for performing blitter operations according to claim 1 wherein the means for modifying the blitter description includes means for vertically scaling the source image to fit the target image.

3. The apparatus for performing blitter operations according to claim 1 wherein the means for modifying the blitter description includes means for horizontally scaling the source image to fit the target image.

4. The apparatus for performing blitter operations according to claim 1 wherein the means for modifying a blitter description includes means for converting the source image color format to a target image color format.

5. A method for performing blitter operations to transfer data corresponding to pixels of a source image to a target buffer for holding data for a target image to be displayed on a monitor, the blitter operation being defined by a blitter description, which includes information describing sizes of the source and target images, color formats of the source and target images, and further describes the target image in terms of at least one visible rectangle, the method comprising the steps of:

modifying the blitter description;

creating a line-type description of the target image from the visible rectangle description of the target image, the line-type description comprising at least one run of pixels defined by visible and non-visible pixel states, the line-type description further comprising a repeat count indicating the number of lines of the target image corresponding to the line-type description;

generating a machine code sequence to be associated with the line-type description, the machine code sequence including machine code instructions to move and process data that are defined by visible runs of the line type description; and executing the machine code sequence, in accordance with the line-type description, the machine code sequence being invoked a number of times equal to the repeat count of the line-type description so as to transfer the data corresponding to the pixels of a source image to the target buffer in accordance with the modified blitter description during the blitter operation.

6. The method for performing blitter operations according to claim 5 wherein the step of modifying the blitter description further comprises modifying the blitter description to vertical scale the source image to fit the target image.

7. The method for performing blitter operations according to claim 5 wherein the step of modifying the blitter description further comprises modifying the blitter description to horizontal scale the source image to fit the target image.

8. The method for performing blitter operations according to claim 5 wherein the step of the modifying the blitter description folder comprises converting the source image color format to a target image format.

9. A computer program product for performing blitter operations to transfer data corresponding to pixels of a source image to a target buffer for holding data for a target image to be displayed on a monitor, the blitter operation being defined by a blitter description, which includes information describing sizes of the source and target images, color formats of the source and target images, and further describes the target image in terms of at least one visible rectangle, the computer program product comprising:

computer usable medium having computer readable program code embodied therein;

program code embodied within said computer usable medium, for creating a line-type description of the target image from the visible rectangle description of the target image, the line-type description comprising at least one run of pixels defined by visible and non-visible pixel states, the line-type description further comprising a repeat count indicating the number of lines of the target image corresponding to the line-type description;

program code embodied within said computer usable medium, for generating a machine code sequence to be associated with the line-type description, the machine code sequence including machine code instructions to move and process data that are defined by visible runs of the line type description; and program code embodied within said computer usable medium, for executing the machine code sequence, in accordance with the line-type description, the machine code sequence being invoked a number of times equal to the repeat count of the line-type description so as to transfer the data corresponding to the pixels of a source image to the target buffer in accordance with the modified blitter description during the blitter operation.

10. The computer program product for performing blitter operations according to claim 9 wherein the program code, embodied within said computer usable medium for modifying the blitter description further includes program code, embodied within said computer usable medium for vertically scaling the source image to fit the target image.

11. The computer program product for performing blitter operations according to claim 9 wherein the program code, embodied within said computer usable medium for modifying the blitter description further includes program code, embodied within said computer usable medium for horizontally scaling the source image to fit the target image.

12. The computer program product for performing blitter operations according to claim 9 further includes program code, embodied within said computer usable medium for converting the source image color format to a target image color format.

* * * * *

UNITED STATES PATENT AND TRADEMARK OFFICE
CERTIFICATE OF CORRECTION

PATENT NO. : 6,307,559 B1  Page 1 of 1
DATED : October 23, 2001
INVENTOR(S) : Hancock et al.

It is certified that error appears in the above-identified patent and that said Letters Patent is hereby corrected as shown below:

<u>Column 16,</u>
Line 67, please delete the word "form" and insert the word -- from --

Signed and Sealed this

Twenty-eighth Day of May, 2002

Attest:

JAMES E. ROGAN
*Attesting Officer*   *Director of the United States Patent and Trademark Office*